Patented Aug. 30, 1932

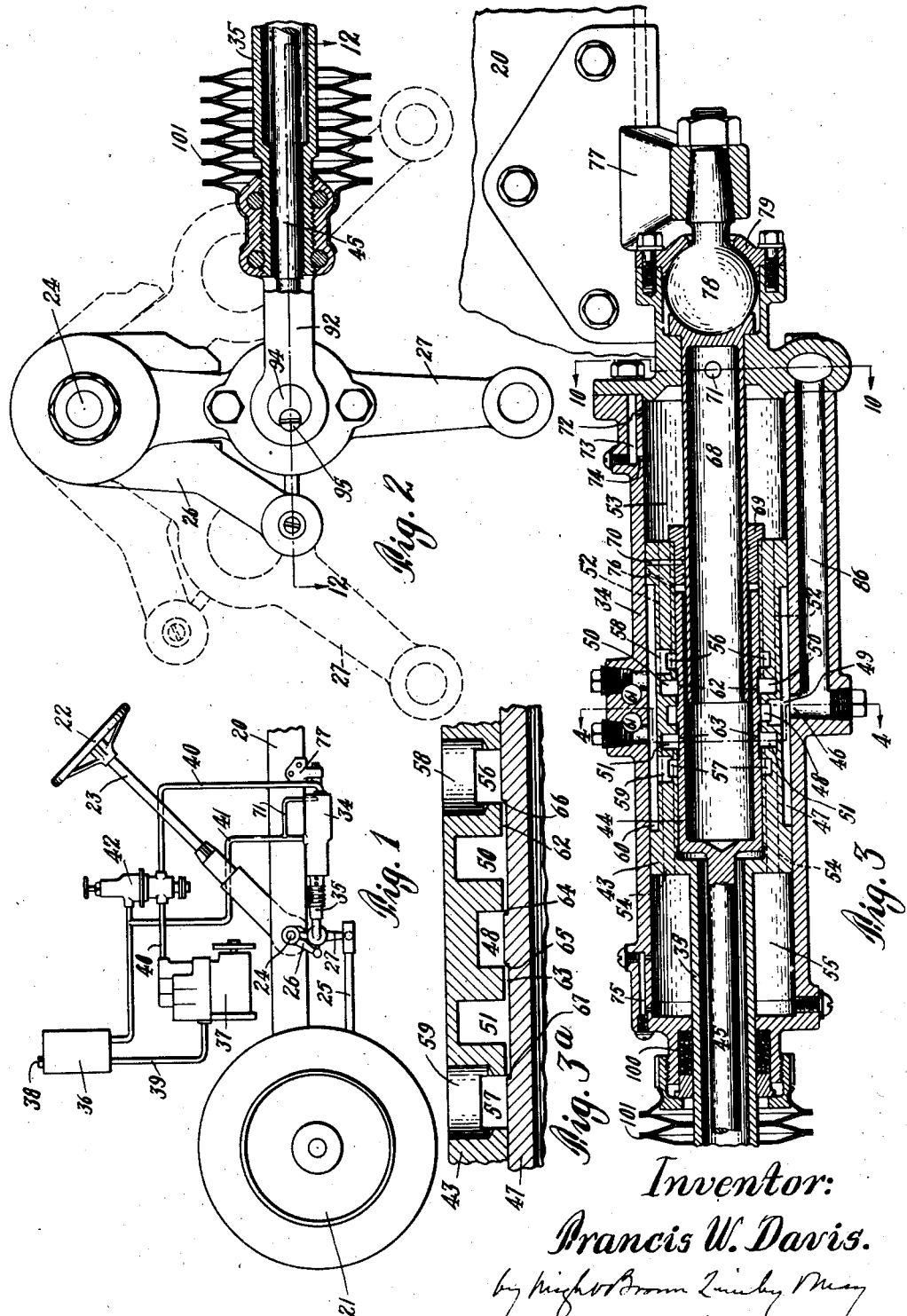

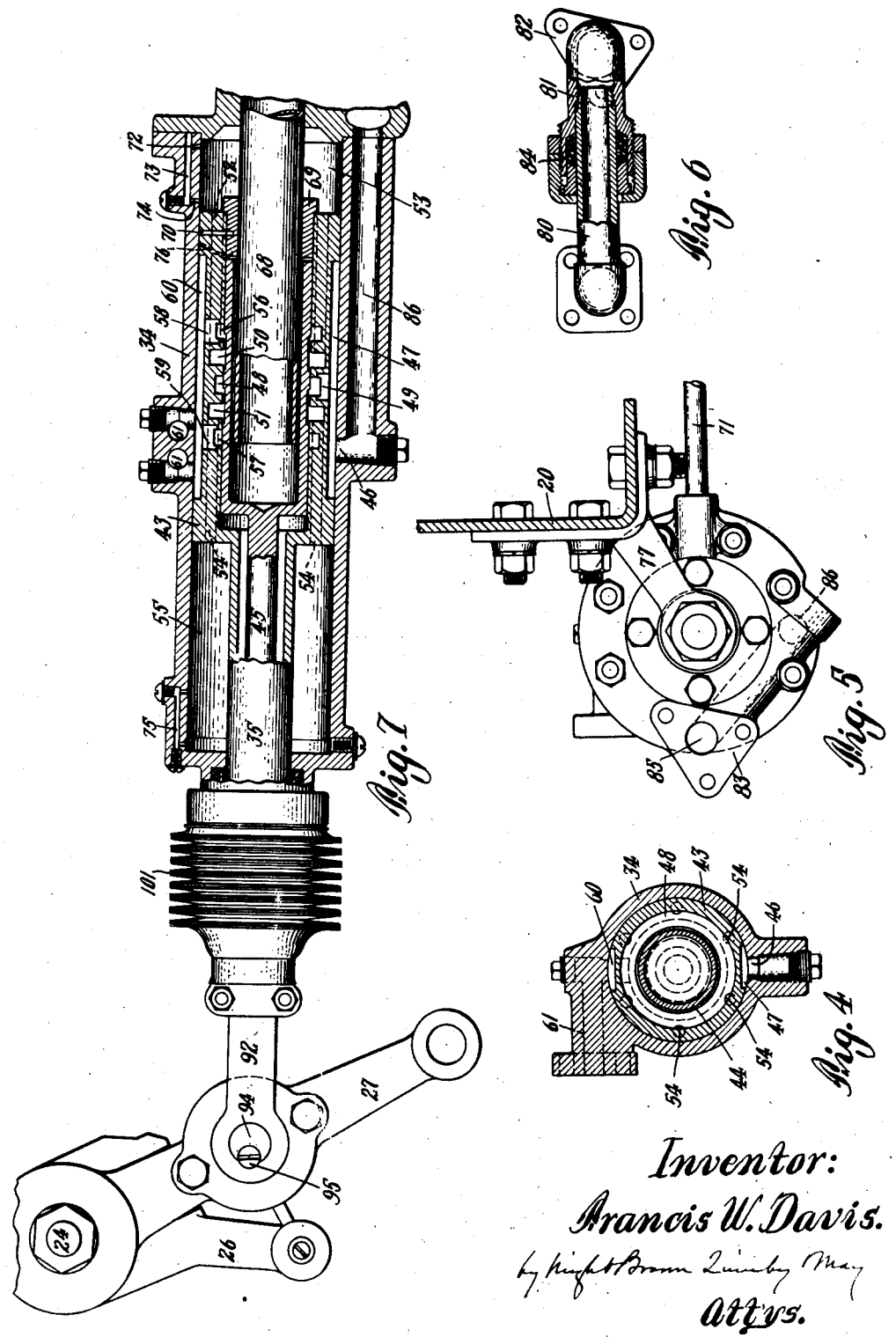

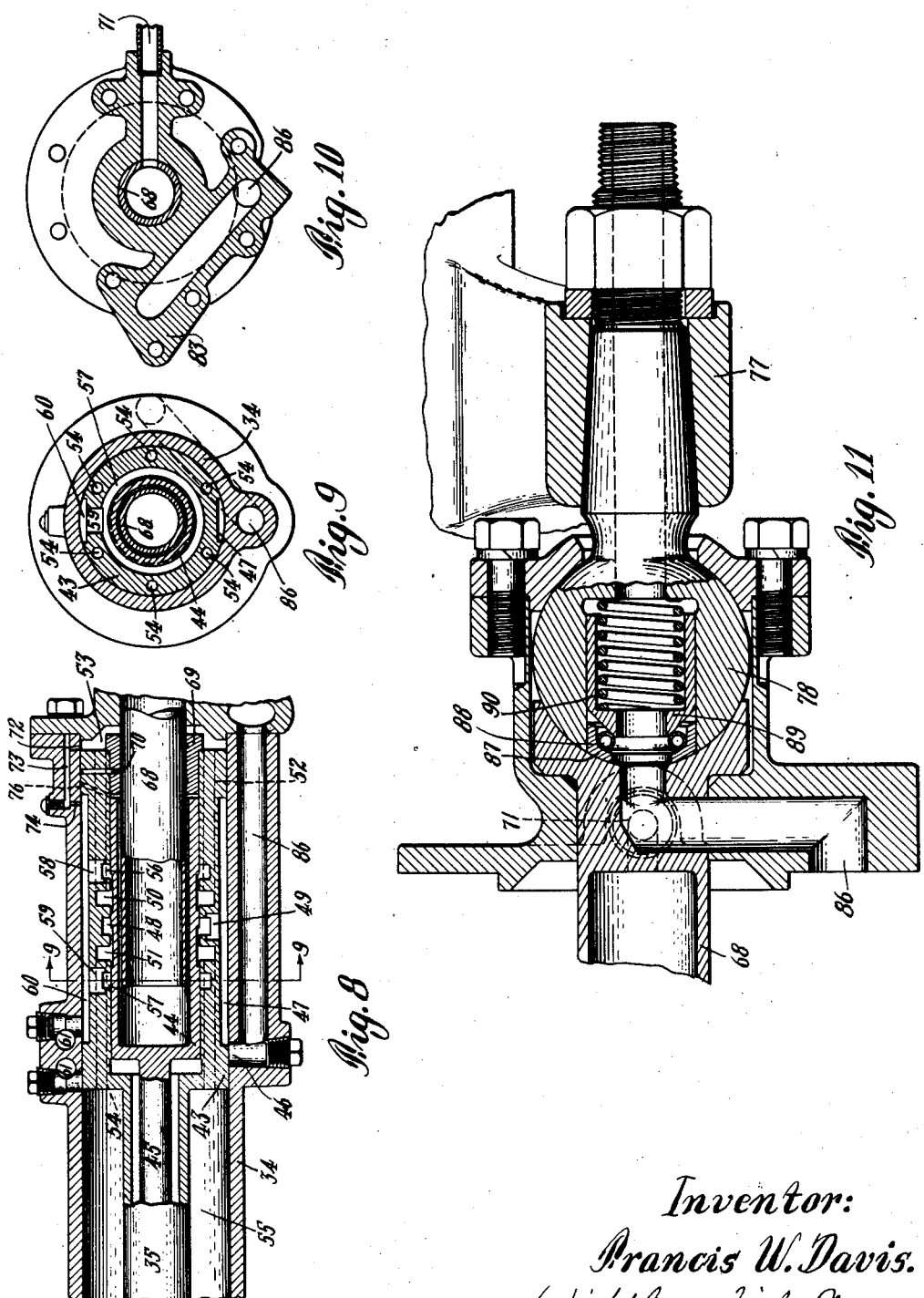

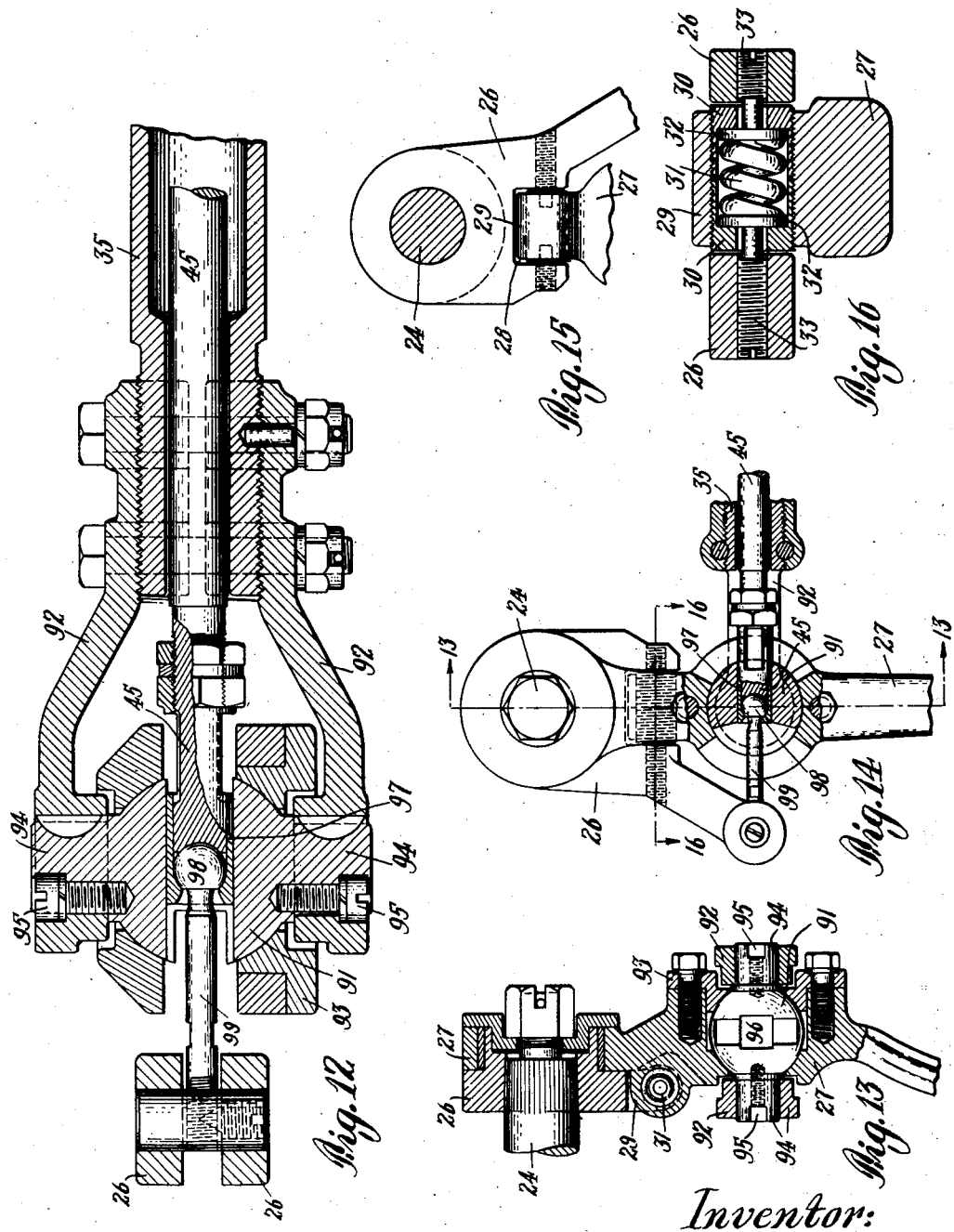

1,874,248

UNITED STATES PATENT OFFICE

FRANCIS W. DAVIS, OF WALTHAM, MASSACHUSETTS

AUXILIARY POWER STEERING GEAR

Application filed February 12, 1927. Serial No. 167,730.

This invention relates to power devices adapted to augment automatically the applied force at the power input end of a mechanism to overcome excessive resistance at the power output end of the mechanism. A practical embodiment of the invention is found in a power attachment for automobiles which can be connected into the steering gear in such a way that while the automobile under ordinary conditions of travel on a good road is steered directly by manual power as is now customary, the attachment will automatically and instantly act to augment the manual force applied to the steering wheel with force from fluid power mechanism whenever the resistance of the vehicle wheels to steering forces exceeds a predetermined value.

In certain branches of the automobile industry there has been a trend during the past few years toward larger and heavier automobiles equipped with an increasing number of accessories adding still further to the total weight. The working parts of an automobile of this type must necessarily be comparatively massive and heavy so that the manual effort required by an operator to steer such an automobile is often great, particularly when maneuvering in traffic at slow speeds. The provision of a satisfactory steering gear for automobiles of the heavier types which could be operated without an exhausting effort on the part of the operator has been a pressing problem in the industry. The problem has been made more acute by the general adoption of the so-called balloon tires which cause a marked increase in the steering resistance of an automobile. In an effort to overcome the difficulty, steering mechanisms have been constructed with a view to eliminating as far as possible the friction between the working parts. While this reduced to some extent the steering resistance of the vehicle, it also gave rise to a still greater evil, that is, a tendency on the part of the steering wheels to "shimmy" or vibrate excessively, with resulting unpleasant vibrations of the car as a whole and harmful stresses on the steering mechanism. Since frictionless joints and connections in the steering mechanism are thus objectionable, the necessity for the use of power to assist the operator becomes the more apparent.

Another factor to be considered in the practical steering of an automobile is the "reversibility" of the mechanism, that is, the transmission of road shocks through the steering mechanism from the vehicle wheels to the steering wheel whereby when a rut or the like tends to deflect the vehicle wheels, the force thus impressed on the wheels is transmitted to the steering wheel, resulting in what is known as "wheel fight". It is obvious that too great a degree of reversibility in a steering mechanism is dangerous since a sudden deflection of the wheels by an obstruction is liable to wrench the steering wheel from the hands of the operator and cause him to lose control of the car. On the other hand, complete irreversibility is objectionable since in such a case all the road shocks and veering tendencies of the vehicle are absorbed by the steering mechanism and the operator loses all the "feel" of the car, which is essential to satisfactory steering. A certain amount of irreversibility has heretofore been obtained by the use of such mechanical devices as a screw and nut, a worm and sector, or a cam and lever. These devices usually result in a comparatively large reduction in motion (or mechanical advantage) between the steering wheel and the vehicle wheels whereby the steering wheel must be turned through a relatively large angle to cause a small deflection of the vehicle wheels. Such reduction of motion is necessary on heavy cars to enable an average operator to steer the car at all, but the excessive turning of the steering wheel which is necessary in turning corners or maneuvering in traffic is highly objectionable and in some circumstances dangerous.

According to the present invention, a power "booster" is supplied which is capable of being attached to existing steering mechanisms of most makes of automobiles with but slight changes, which is adapted for direct non-elastic hand steering where the steering resistance is slight, which instantly and automatically augments the manual steering efforts of the operator by the application of power from fluid pressure when the steering resistance exceeds a substantial predetermined adjustable value, and which has an easily adjustable reversibility by which the maximum torque which can be impressed on the steering wheel by road shocks is limited to a predetermined value.

Other advantageous features of construction and operation will be apparent to one skilled in the art from the disclosure of the invention in the following description and on the drawings, of which;—

Figure 1 is a diagrammatic view of a fluid power system for automobiles embodying my invention.

Figures 2 and 3 taken together are a side elevation of the power-applying device, a portion being broken away in section to show certain working parts.

Figure 3a is a sectional detail on an enlarged scale of a portion of Figure 3.

Figure 4 is a section on the line 4—4 of Figure 3.

Figure 5 is a rear end elevation of the portion of the device shown in Figure 3.

Figure 6 is a detail partly in section of a pipe connection.

Figure 7 shows a portion of the apparatus illustrated in Figures 2 and 3, the parts being in a different position of operation.

Figure 8 shows a portion of the mechanism illustrated in Figure 3, the parts in this figure being in another position of operation.

Figure 9 is a section taken on the line 9—9 of Figure 8.

Figure 10 is a section on the line 10—10 of Figure 3.

Figure 11 is a detail in longitudinal section of a modified form of the pipe connection.

Figure 12 is a section on the line 12—12 of Figure 2.

Figure 13 is a partial section taken on the line 13—13 of Figure 14.

Figure 14 is a side elevation of a portion of the apparatus shown in Figure 2, the figure being partly broken away to illustrate some of the inner working parts.

Figure 15 is a detail of parts shown in Figures 2 and 14.

Figure 16 is a section on the line 16—16 of Figure 14.

Referring to the drawings in detail, 20 indicates one of the longitudinal side frames of an automobile, one of the front wheels of which is indicated at 21. The steering wheel of the vehicle is shown at 22 mounted on a steering post 23 which is connected by suitable means to rotate a cross shaft 24 which is ordinarily connected by a simple lever fixed on this shaft to a drag link or reach rod 25, the latter being connected to the vehicle wheels by well known linkages to impart steering deflection thereto. The parts so far described may be such as are found on many makes of cars on the market at the present time. One of the objects of this invention is to interpose in the mechanical system connecting the steering wheel 22 with the vehicle wheels 21, a power-actuable device capable of augmenting the manual steering effort of the operator under certain predetermined conditions, such power mechanism being capable of attachment to most of the standard makes of automobiles with the least possible rearrangement or replacement of the original parts of the car. The interposition of the power unit in the mechanical train connecting the steering wheel with the steered vehicle wheels may be made by replacing any convenient element of said train by a pair of related elements constructed to act together to perform substantially the function of the replaced element, but with a limited amount of relative motion or play between them, such play being preferably opposed in both directions by resilient means. According to the invention, the related elements are connected to a fluid power mechanism constructed, as hereinafter described, to be controlled in its operation by relative motion of the related elements. For purposes of illustration, the power mechanism as shown and hereinafter described is interposed between the cross shaft 24 and the reach rod 25. As indicated in Figure 1, the lever arm which is usually fixed to the cross shaft 24 to transmit motion of the shaft to the reach rod 25 is, according to my invention, replaced by a lever assembly comprising two separate levers, one of which indicated at 26 is fixed to the cross shaft 24, the other lever 27 being loosely mounted on the shaft 24. For convenience, these two levers will be hereinafter referred to respectively as the "fixed" lever and the "floating" lever. As shown in Figures 2 and 14, the levers 26 and 27 normally move together as a single unit. However, a certain amount of play is made possible between them by the construction shown best in Figures 15 and 16. As therein indicated, the lever 26 has a portion forming a recess 28 which receives a lug 29 formed on one side of the floating lever 27. If desired, the lug could be formed on the fixed lever to be received by a recess in the floating lever. As shown in Figure 16, the lug 29 is perforated and internally threaded to receive a pair of thimbles 30. The thimbles are made of such a length that when they are screwed into the lug 29 until their ends abut as shown in Figure 16, the total length of the two thimbles 30 will be sligtly less than the width of the recess 28 in the fixed lever 26. This clearance between the ends of the thimbles 30 and the sides of the recess 28 is the measure of the maximum play permitted between the fixed lever 26 and the floating lever 27, so that it is obvious that without further apparatus the steering gear would be operable exactly like the original gear provided with a simple lever in the place of the fixed and floating levers, except that there would be a small play in the connection between the cross shaft 24 and the reach rod 25. In order to provide resilient means tending to keep the ends of the thimbles equally spaced from the adjacent sides of the recess 28, the thimbles 30 are made hollow as shown in Figure 16 and when inserted in the lug 29 form a chamber which contains a spring assembly comprising a suitable spring 31, and a pair of disks 32 at the ends of the spring 31. This assembly bears against shoulders formed within the thimbles 30 so that the spring 31 may be normally compressed by suitable spacing of the thimbles. The characteristics of the spring 31 may be chosen as desired to obtain certain characteristics of behavior in the steering gear as will be hereinafter described. It is ordinarily preferable to use a spring 31 of considerable stiffness and of such a length as to place it under a considerable degree of compression when the thimbles 30 are set up in the lug 29 so that their ends abut. Contacting with the outer faces of the disks 32 are the ends of adjustable screws 33 which are threaded through the fixed lever 26 from opposite sides and are adjusted so that when the floating lever is centered or in "neutral" position with respect to the fixed lever, as illustrated in Figure 17, the ends of the screws 33 rest against the disks 32. This structure provides a cushioned connection between the fixed and floating levers and it will be apparent that before play or relative motion can take place between the fixed and floating levers, enough force must be applied to one or the other to overcome the compressive resistance of the spring 31. For example, referring to Figure 16, motion of the fixed lever 26 to the left, the lever 27 being held fixed, would result in the screw 33 on the left drawing away from its adjacent disk 32 while the right hand screw 33 would move its disk 32 against the entire expanding force of the compressed spring 31. With the mechanism thus far described, it will be apparent that ordinarily the vehicle would steer exactly as with the usual connections in the steering gear, except that if a resistance of sufficient magnitude should occur in the steering gear to compress the spring 31, then a certain amount of play would be permitted between the steering wheel and the vehicle wheels. Such a resistance to the steering effort of the operator might result from ruts or other road conditions. It is an object of this invention to provide fluid power apparatus which is called into operation automatically and instantly by relative motion of the fixed and floating levers, whereby if the steering effort of the operator is opposed by a sufficient force on the vehicle wheels or friction of the steering parts or both to cause a compression of the spring 31, the relative motion of the fixed and floating levers accompanying such compression of the spring will cause the operation of a fluid power mechanism acting on the floating lever 27 to effect a follow-up motion thereof and to restore the floating lever to its neutral position relative to the fixed lever 26. It is therefore obvious that the manual effort required by the operator to steer a power equipped steering mechanism according to my invention may be limited as desired by the selection of suitable characteristics of the spring 31. Taking for an example, the extreme case of having no spring 31 at all, the effort of the operator to steer the vehicle is reduced to merely that of overcoming the friction of the parts connecting the steering wheel 22 with the cross shaft 24 which carries the levers 26 and 27. With apparatus of this kind, in case of failure of the power system, the steering mechanism would behave essentially like an ordinary steering mechanism with a slight play in the linkage. The omission of the spring 31, however, would ordinarily be objectionable from a practical point of view since the total lack of steering resistance serves to give the operator a completely detached feeling and he loses the "feel" of the car which is essential to natural and easy steering. It may be remarked that the system without the spring 31 is practically irreversible, that is, road shocks or other forces on the wheels tending to deflect the steering wheels are absorbed by the play between the levers 26 and 27 which automatically brings the fluid power into action to restore the levers to their relative neutral position without any force being transmitted to the steering wheel 22 unless the deflection of the vehicle wheels be violent enough to move the floating lever beyond the limit of play so that it contacts with the lever 26.

The fluid power system which is employed to augment the manual effort of the operator is set forth diagrammatically in Figure 1. As therein shown, it consists, generally speaking, of a cylinder 34 containing a power piston which is connected by a piston rod 35 directly to the floating lever 27 and is actuated by fluid pressure within the cylinder. A suitable reservoir 36 and a pump 37 are connected with the cylinder 34 by suitable piping, the reservoir communicating with the atmosphere by a small vent in a cap 38 covering a filling port. As shown, a pipe line 39 extends from the reservoir to the pump 37 and from the pump the fluid is forced through a pipe 40 to the cylinder. A pipe 41 is connected to the outlet of the cylinder and leads back to the reservoir 36. A by-pass valve 42 is connected to the supply pipe 40 and the discharge pipe 41 so that if pressures within the cylinder or supply pipe exceed a certain predetermined value, the pressure will be relieved through the valve 42. The power actuation of the piston (designated generally as 43) is controlled as by a cylindrical valve slide 44 fitted concentrically within the piston 43 which in turn is fitted to slide within the cylinder 34. The slide 44 is connected as by a suitable rod 45 to the fixed lever 26, the connection being articulated as by a ball and socket joint as shown in Figures 12 and 14 in order to allow for the different relative positions of the parts indicated in Figure 2. The piston 43 and the slide 44 are provided with cooperating ports or passages for the power fluid, these ports and passages being so arranged that relative motion of the slide 44 and the piston 43 resulting from corresponding relative motion of the fixed and floating levers 26, 27 will direct the power fluid into the chamber within one end or the other of the cylinder 34 so as to act upon the corresponding end of the piston and move the piston in a direction to restore the fixed and floating levers to their neutral position.

The construction by which this control of the power fluid is effected is illustrated in Figure 3, the parts being also illustrated in Figures 7 and 8 in various positions of operation. Referring to Figure 3, which shows the piston 43 and the slide 44 in their respective neutral position, the construction of the piston and slide which offers variable channels for the flow of power fluid through the cylinder may be described as follows:—

The power fluid which hereinafter for convenience will be referred to as "oil", although the use of any fluid comes within the purview of this invention, enters the cylinder 43 through a suitable inlet 46 which is normally in communication with a longitudinal groove or passage 47 formed in the exterior surface of the piston 43. The groove 47 is preferably in communication with the inlet 46 for all positions of the piston within the cylinder except its extreme position at one end or the other of the cylinder, when as indicated in Figure 8 it is preferred that the inlet port 46 be shut off. Formed in the inner wall of the piston 43 are a series of grooves or passages as follows:—

The annular passage 48 is centrally located and is connected by a port 49 to the longitudinal passage 47. To the right of the annular passage 48 is another annular port or passage 50, while to the left is a similar port or passage 51. The part 50 communicates by a suitable number of channels 52 with a chamber 53 formed in the right hand end of the cylinder by the piston. In like manner, the port 51 communicates by a suitable number of channels 54 with a chamber 55 formed in the left hand end of the cylinder by the piston 43. Figure 9 illustrates the arrangement of the channels 54 as cut by the section plane 9—9 through Figure 8. A similar section taken further to the right in Figure 8 would show an identical arrangement of the channels 52 in the wall of the piston. Two more annular ports or passages are formed in the inner wall of the piston 43, these ports being designated as 56, 57, and communicating respectively through ports 58, 59 with a longitudinal exterior groove or passage 60 similar but opposite to the groove 47. The groove 60 communicates at all times with the cylinder outlet which as shown comprises a pair of passages 61 (Figure 4). In order to connect the various internal grooves or ports of the piston so as to introduce oil into or permit oil to escape from the chambers 53, 55, the slide 44 is provided on its exterior surface with annular grooves 62, 63, these grooves being in general opposite the interior grooves in the piston 43 but variable in relation thereto according to the relative positions of the slide and piston.

The operation of the valve formed by the annular ports in the piston 43 and the slide 44 may be followed from the detail illustrated in Figure 3a, it being remembered that the various passages therein shown extend around and interconnect through substantially their entire circumference. The piston and valve as fragmentarily shown in Figure 3 are therein illustrated in their neutral position, that is, their position when the piston is at rest. When the piston and slide are in their neutral position, the oil which is supplied to the cylinder is permitted to flow through uninterruptedly and be discharged through the ports 61, the fluid entering and leaving the cylinder under such conditions having only a small pressure arising from the hydraulic head between the cylinder and the highest point of the circulating system, and the frictional resistance to flow offered by the passages in the cylinder and the discharge pipe 41. The course or path of the oil through the cylinder under these conditions is as follows:—

The oil enters the cylinder through the port 46 (Figure 3) and flows into the longitudinal groove 47, thence through the port 49 into the annular passage 48. From the passage 48, it flows in both directions through narrow openings 64, 65 into the annular grooves 62 and 63, thence through narrow openings 66, 67 into the annular passages 56 and 57, the latter being in constant communication with the outlet ports 61 through the longitudinal channel 60. The openings 64, 65, 66, 67 are formed by the clearances between the side walls of the annular channels in the piston 43 and of those in the slide 44 so that they are variable by relative motion of the piston and slide. The mechanism is preferably adjusted so that when the fixed lever 26 and the floating lever 27 are in their relatively neutral position as shown in Figure 16, the piston 43 which is connected with the lever 27 and the slide 44 which is connected with the lever 26 will be in their neutral position as illustrated in Figure 3a. In this position, the oil entering the central annular groove 48 has an evenly divided flow in both directions maintaining equal pressures in the annular passages 50 and 51 which connect respectively with the chambers 53, 55 in the opposite ends of the cylinder 34. When, however, the fixed and floating levers 26, 27 are relatively moved, this relative motion is accompanied by relative motion of the slide 44 and the piston 43. If, for example, in Figure 3, the slide 44 is moved toward the right, the relation of the annular passages in the slide and piston will be changed, the limiting position of this change being illustrated in Figure 7 and determined by the play between the fixed lever 26 and the floating lever 27. As shown in Figure 3a, a slight motion of the slide 44 to the right will have the effect of partially closing the connection 64 between the passages 48 and 62, and at the same time opening wider the connection 65 between the passages 48 and 63. This change in the openings 64 and 65 is accompanied by a similar change in the openings 66, 67 whereby the opening 66 is widened while 67 is narrowed or partly closed. As a result of these changes in the openings connecting the various annular passages, the flow of oil from the passage 48 is increased into the passage 63 while the outlet from the passage 63 into the ports 57 and 59 is narrowed. As a result of an increased supply to the passage 63 and a partial closing off of the outlet, an increase of pressure in the passage 51 is instantly built up, this increase of pressure being communicated through the channels 54 to the chamber 55. The narrowing of the opening 64 between the passage 48 and the passage 62 at the same time reduces the flow of oil into the passage 62 while the widening of the opening 66 permits oil in the passage 62 to flow out more freely through the ports 56, 58 to the outlet 61. Since the passage 50 is directly connected by the channels 52 to the chamber 53, it is thus seen that the chamber 53 is permitted to discharge oil freely into the outlet. The net result of these changes in valve openings is an increase of oil pressure in the chamber 55 with no increase of pressure in the chamber 53, this difference in pressure on the ends of the piston tending to result in motion of the piston in a direction to follow the motion of the slide and thus to resume its neutral position relative thereto, whereupon the valve openings 64, 65, 66, 67 resume their equalized clearance, and balanced pressures in the two chambers 53, 55 is restored. In other words motion of the slide relative to the piston results in a simultaneous constriction of the two passages which carry the oil in divided flow through the cylinder, the constriction in one of these passages being at a point anterior to the branch channel connecting the passage with its respective pressure chamber, the other passage being constricted at a point posterior to its branch channel. Since both passages are simultaneously constricted, the oil supplied thereto is backed up in the supply line, thus causing the pressure therein to increase. As the slide moves progressively from its neutral position to an extreme position, the branch passages are increasingly constricted until they are finally closed entirely. This results in a progressive building up of the pressure in the supply line from a normal low pressure to the maximum pressure permitted in the supply line, this maximum being determined by a relief bypass as is hereinafter described. The pressure built up in the supply line by relative motion of the slide and piston is communicated to the passage having its constriction beyond or posterior to the branch channel, this effect being enhanced by the widening of the port between the supply line and this passage. The increased pressure in this passage is communicated through its branch channel to its corresponding pressure chamber so that pressure in this chamber is progressively built up according to the extent of movement of the slide from its neutral position. If the slide reaches one of its limiting positions relative to the piston, the passages are both closed entirely and maximum pressure is built up in the supply line, which pressure is communicated to the pressure chamber away from which the slide has been moved. It is obvious that motion of the slide 44 to the left will in like manner increase the pressure in the chamber 53 without increasing the pressure in chamber 55 with a resulting tendency on the part of the piston to follow the motion of the slide to the left until the neutral position is resumed. The rapidity with which the piston follows up motion of the slide will depend upon various factors such as the oil pressure available, the dimensions of the cylinder and piston, and the magnitude of the opposing force which brings the fluid or power action into play. In case the resistance on the vehicle wheels to steering motion is great, the slide and piston may assume limiting positions with relation to each other, one of which is illustrated in Figure 7, wherein the slide moves sufficiently far to close completely the openings 64 and 67 and to widen the openings 65 and 66 to their fullest extent. The width of the openings 64, 65, 66, 67 may be made of any desired magnitude. It is found, however, that a clearance of only a few thousandths of an inch is sufficient for the purpose. These small clearances permit sufficient oil to flow through the device when in neutral position and result in an extremely sensitive action whereby the apparatus responds promptly to the slightest relative motion of the fixed and floating levers 26 and 27. In the embodiment of the invention as illustrated, the piston 43 is directly connected to the steered portion of the vehicle including the steering arms and tie-bar. The steering arms are usually provided with stops to limit the deflection of the vehicle wheels in either direction. The connection between the piston 43 and the steered part is preferably so made that when the steering arms reach their stops in either direction, there is still clearance between the piston and the end wall of the cylinder, as in Figure 8, so that at no time does the piston bear against either end wall of the cylinder. In order to avoid excessive stresses on the steered part when the steering arms have been brought up against their stops, the outlet openings 61 are so located that the pressure end of the cylinder is opened directly into the discharge ports when the piston reaches either end of its stroke as in Figure 8, so that if the steering arms are brought up against their stops, they can be pressed thereagainst only by the manual force of the operator unassisted by fluid power. This construction is a safeguard against injury to the steering mechanism which might otherwise result from a strong manual effort on the part of the operator coupled with the full power of the fluid mechanism. As previously described, the spring 31 which acts as a cushion stop between the fixed and floating levers is preferably somewhat stiff and is set up between the thimbles 30 under considerable compression. The compressive force of this spring holds the fixed and floating levers in their relative neutral position during the ordinary course of steering so that the piston 43 and the slide 44 normally are moved together and no oil pressure power is called into play. When, however, the resistance of vehicle wheels and steering linkage is sufficient to cause compression of the spring 31 and relative motion of the fixed and floating levers, the oil pressure instantly tends to restore the neutral position of these parts so that the maximum effort required of the operator is determined by the characteristics of the spring 31. By selecting a spring of suitable characteristics, such as suitable length and stiffness, the steering effect may be readily adjusted. For example, a relatively stiff spring under little or no initial tension would result in power actuation of the steered part upon a relatively small resistance to the operator's steering effort. The stiffness of the spring, however, would quickly build up a resistance to relative movement of the fixed and floating levers so that while the fluid power would be easily called into play to a certain extent, a relatively and increasingly larger steering resistance would be necessary to utilize the fluid power more fully. Again, if a longer spring with less stiffness were used, the compression of the spring necessary to get it into the space between the disks 32 would put it under comparatively high initial stress which would, however, vary but little by reason of the motion of one of the disks arising from relative motion of the fixed and floating levers. With such a spring, ordinary steering would be entirely by manual effort, but if the steering resistance should be sufficient to compress the spring, the full power of the fluid would be available with little additional resistance. It is obvious that a wide range of steering effects are available through the choice of the spring 31.

In the ordinary course of steering, the by-pass valve will be little used. There are occasions, however, when such a by-pass becomes necessary. For example, when an attempt is made to deflect the vehicle wheels when the vehicle is at rest with the wheels in ruts or against a curb, a heavy stress is put upon the steering gear by reason of the excessive resistance offered by the vehicle wheels. If no limit were placed on the fluid power, there would be great danger of injury to the steering mechanism. Under such circumstances, however, the by-pass valve which is set to operate at a predetermined pressure prevents the building up of excessive pressures in the cylinder with consequent harmful stresses on the steering gear.

In order to equalize the effective pressure area of the opposite ends of the piston 43, a hollow equalizing rod 68 is provided, this rod having a cross section substantially equal to that of the connecting rod 35 at the other end of the piston. The equalizing rod 68 telescopes with the slide 44 and the inner chamber formed thereby is separated from the chamber 53 as by a bushing 69 which is secured to the piston as by a pin 70 and which fits closely around the rod 68. In order to provide for the varying volume of the chamber formed by the rod 68 and the slide 44 caused by the telescoping motion of the latter, a compensating pipe 71 is provided which connects directly with the drain pipe 41 or the reservoir 36, thus permitting oil to enter or leave the inner chamber freely.

The presence of bubbles of gas or vapor in the cylinder or other portions of the system is usually objectionable since they provide an elastic cushion which detracts from the advantages of positive operation inherent in the use of an incompressible fluid such as oil. It is practically necessary therefore to provide means for removing bubbles of gas or vapor from the system, particularly from the chambers within the cylinder 34 where such bubbles are liable to accumulate. To this end, suitable ports of relatively small cross section are supplied which are adapted to open from the respective chambers into the discharge port when the parts are in certain positions. Referring to Figures 3, 7 and 8, at the rear end of the cylinder 34 a small port 72 leads into a longitudinal passage 73 which is connected to another small port 74 leading back into the chamber 53. Whenever the piston 43 travels to the rearward end of its throw as in Figure 8, the chamber 53 is thus directly connected with the discharge groove 60 and the flow of oil from the chamber 53 through the passages 72, 73, 74 sweeps out any bubbles of gas or vapor which may have collected in the top of the chamber 53. In like manner, a similar passage generally designated as 75 is provided at the forward end of the cylinder to sweep bubbles from the chamber 55 when the piston reaches its limiting forward position. A port 76 is provided to clear the inner chamber of gas bubbles by communicating with the discharge port 61 directly when the piston approaches its extreme forward position.

Since the piston rod 35 and the slide connecting rod 45 are connected to levers which swing on a shaft, the entire cylinder 34 is preferably swivelly mounted at its rear end as shown in Figure 3. A suitable bracket 77 is secured to the frame member 20 and bolted or otherwise secured to the bracket 77 is a ball 78 on which is fitted a socket joint formed by the rear end of the cylinder 43 and a suitable cap 79. The pipes connected to the cylinder are therefore preferably supplied with flexible connections to allow for the motion of the cylinder on its joint. The discharge pipes 41 and 71 may have a coupling of suitable flexible tubing (not indicated) since the oil in these pipes is ordinarily at low pressures. The oil supply pipe 40, however, on account of the high pressures to which it is subjected is preferably connected to the cylinder casting by a swivel member as shown in Figure 6. The latter form of connection may be found preferable where high oil pressures are used. As shown, a pipe member 80 is loosely threaded into a pipe member 81, the former being connected to the fixed supply pipe 40 while the latter is attached as by a suitable plate 82 which abuts a similar plate 83 formed on the cylinder 34. A suitable packed joint indicated generally at 84 is provided to make the swivel connection oil tight. This may be of any preferred construction. The axis of the pipe connection 80, 81 is arranged to pass through the center of the ball 78 on which the cylinder rocks so that rocking motion of the cylinder merely turns the pipe member 81 on the pipe member 80. Oil entering the opening 85 in the plate 83 is led down through a suitable passage into a longitudinal channel 86 and thence into the inlet port 46 (Figures 3, 5 and 10).

Instead of the swivel oil connection illustrated in Figure 6, a modified structure may be utilized as illustrated in Figure 11. In this case, the inlet to the channel leads through the ball joint itself. Within the ball 78 a chamber is provided, communicating with the supply pipe 40. This chamber opens also into a passage leading to the channel 86. Within the chamber is a suitable gasket 87 which surrounds the opening to the channel 86 and is pressed against the wall of the socket containing the ball 78 as by an expansion spring 88 which is expanded against the washer by the pressure of the conical end of a plunger 89 pressed by a suitable spring 90. This construction allows rocking motion of the cylinder 34 on its ball and socket joint but maintains an oil-tight connection at the joint.

In order that the levers 26 and 27, which are respectively connected with the connecting rods 45 and 35, may assume the various positions of operation indicated in Figure 2, the connections between the lever 26 and the rod 45 and between the lever 27 and the rod 35 are pivotal as shown in Figures 12, 13 and 14, a ball and socket joint being preferably used in each case. As shown, the connecting rod 35 is secured to a ball member 91 as by a pair of arms 92. The ball member 91 is arranged to work in a socket formed by a portion of the lever 27 and a suitable cap 93. The ball member 91 is provided with laterally projecting portions 94, on which the connecting members 92 are keyed and secured as by set screws 95. The ball member 91 is vertically slotted and provided with a horizontal passage 96 to receive a sliding ball and socket joint which connects the rod 45 with the fixed lever 26. Sliding in the passage 96 is provided a sleeve 97 which forms with the end of the rod 45 a socket for a ball member 98, the latter being on the end of a rod 99 which is swivelly connected to the fixed lever 26. This construction permits the fixed and floating levers to operate the valve members 43, 44 in the cylinder when in any position of operation. In order to prevent oil leakage from the chamber 55, the connecting rod 35 is suitably packed as at 100 and a collapsible boot 101 is preferably provided to protect the connecting rod 35 from dust and dirt.

Having thus described certain embodiments of my invention, it should be evident to those skilled in the art that various changes and modifications may be made therein without departing from its spirit or scope as defined by the appended claims.

I claim:—

1. In apparatus of the class described, a resilient mechanical connection comprising two members movable together substantially as a unit but with a limited amount of relative movement, and means for resiliently opposing such relative movement comprising a pair of opposed shoulders on one of said members, a pair of opposed disks between said shoulders and normally resting respectively against and supported by said shoulders, a compressible spring between said disks engaging the opposed faces thereof, and a pair of contact elements carried by the other of said members normally engaging the outer faces of the respective disks, the contact elements, disks and spring being arranged in line with the direction of motion of said members whereby movement of one member relative to the other will cause one of said contact elements to press its disk away from its supporting shoulder and compress the spring.

2. In apparatus of the class described, a resilient mechanical connection comprising two members movable together substantially as a unit but with a limited amount of relative movement, means for resiliently opposing such relative movement from normal relative position to move one of said members to normal position relative to the other, said resilient opposing means comprising a pair of opposed shoulders formed on one of said members, a pair of opposed disks between said shoulders and normally resting respectively against and supported by said shoulders, a compressible spring between said disks engaging the opposed faces thereof, and a pair of contact elements carried by the other of said members normally engaging the outer faces of the respective disks, the contact elements, disks and spring being arranged in line with the direction of motion of said members whereby movement of one member relative to the other will cause one of said contact elements to press its disk away from its supporting shoulder and compress the spring.

3. In a steering gear, mechanism comprising a pair of members relatively movable from a normal relative position, and means for resiliently maintaining said members in their normal relative position comprising a spring normally distorted by one only of said members and in operative engagement with but not normally distorted by the other said member, said spring being located in the path of motion of said other member whereby it is further distorted by any movement of said other member relative to the first said member.

4. In a control mechanism for a power actuable steering gear, a shaft, a lever fixed thereon, a second lever loosely mounted thereon and rockable about said shaft relatively to said fixed lever, means carried by said levers limiting their relative rocking movement, and a device for resiliently maintaining said levers in a normal relative position midway between their limits of relative motion, said device comprising a spring assembly, means on one said lever engaging said spring assembly at both its ends and normally holding said spring in distorted form, and means on the other said lever engaging said assembly but distorting said spring only when said levers move from their normal relative position.

5. In a steering mechanism having a steering wheel and a steered part, a pair of members positively connected respectively with said steering wheel and said steered part and relatively movable from a normal relative position, means for resiliently maintaining said members in their normal relative position comprising a spring normally distorted by engagement at both its ends with one of said members, said spring being normally in engagement with the other said member but distorted thereby only when said members move from their normal relative position, and power means actuable upon any relative movement of said members from their normal relative position to exert force on said steered part in a direction to restore the members to normal relative position.

6. In a power-amplifying mechanism, a part to be moved, a manually movable part, a pair of elements positively connected respectively with said part to be moved and said manually movable part, said elements being relatively movable from a normal relative position, means resiliently opposing with a resultant force of substantial predetermined initial magnitude any relative movement of said elements from normal relative position, said opposing means including a spring normally engaged by said elements and stops on one of said elements normally holding said spring in distorted form, and power means actuable upon any relative movement of said elements from their normal relative position to exert force on said part to be moved in a direction to restore said elements to their normal relative position.

7. In a power-amplifying mechanism, a part to be moved, a cylinder having fluid supply and discharge ports, a piston fitted for reciprocation within said cylinder and mechanically connected to said part to be moved, the ends of said piston forming with the walls of the cylinder a pair of opposed chambers, a hand-operable member positioned coaxially with said piston for limited longitudinal movement from a normal position relative thereto, said piston and member having ports and passages cooperating to form a pair of channels which are arranged in multiple and are both equally open when the piston and member are in normal relative position, each channel normally connecting the supply port with the exhaust port and with one of said chambers, said piston and member having portions arranged to operate as valves to close off one said channel when the member is moved relatively to the piston in one direction from said normal position and to close off the other said channel when the member is moved relatively to the piston in the other direction, and means resiliently opposing a resultant force of substantial predetermined initial magnitude to any relative movement between said piston and member from their normal relative position.

8. Mechanism of the class described, comprising a fluid-circulating system having a pair of pressure chambers, a supply channel, a discharge channel, a pair of passages extending in multiple from said supply channel to said discharge channel, each said passage communicating with a respective chamber, said mechanism also including a pair of relatively movable valve members forming a pair of variable supply ports between said supply channel and passages, and a pair of variable discharge ports between said passages and discharge channel, the ports of each pair being normally equal but simultaneously and oppositely variable by relative motion of said valve members whereby pressure differences between said chambers may be set up and controlled, and means resiliently opposing a resultant force of substantial predetermined initial magnitude to any relative movement of said valve members from a relative position wherein the ports of each said pair are mutually equal.

9. Mechanism of the class described, comprising a fluid-circulating system having a pair of pressure chambers, a supply channel, a discharge channel, a pair of passages extending in multiple from said supply channel to said discharge channel, each said passage communicating with a respective chamber, said mechanism also including a pair of relatively movable valve members forming a pair of variable supply ports between said supply channel and passages, and a pair of variable discharge ports between said passages and discharge channel, the ports of each pair being normally equal but simultaneously and oppositely variable by relative motion of said valve members whereby pressure differences between said chambers may be set up and controlled, and means for resiliently maintaining said valve members in their normal relative position, said means comprising a spring normally distorted by engagement with one of said members, said spring being normally in engagement with the other said member but not distorted thereby.

10. In a steering mechanism having a steering wheel and a steered part, a pair of members positively connected respectively with said wheel and steered part and relatively movable from a normal relative position, means resiliently connecting said members and presenting a substantial regulable opposition to relative motion between said members whereby said members act as a rigid unit whenever the steering resistance is less than a substantial predetermined force, and power means for causing follow-up movement between said members when said members are moved relatively to one another by a steering resistance greater than said predetermined force.

11. In steering gear, mechanism comprising a pair of members relatively movable in a defined path from a normal relative position, and means for resiliently maintaining said members in their normal relative position comprising a spring assembly operatively engaged by both said members and including a spring normally distorted by one only of said members, the other said member having portions normally abutting said spring assembly, said spring assembly being located in the path of motion of said other member whereby movement of said other member in either direction relative to said one member additionally distorts said spring.

12. The combination with an automobile having guiding wheels, of a steering motor, a means operably connecting said motor to said guiding wheels, a manual steering element, and mechanism operably connecting said steering element with said means, said means and mechanism including coacting and relatively rotatable members, one of said members being operably connected to said steering element, the other member being operably connected to said guiding wheels, spring means between said members stops on said members cooperating with the spring means whereby said members are held rigidly together below a predetermined tangential stress on said one member, and a steering motor control means operable by relative rotation of said members when said predetermined stress is exceeded.

13. In a power steering mechanism, a part to be steered, a cylinder member having a fluid inlet and a fluid outlet, a piston member fitted within said cylinder member and forming therewith a pair of opposed pressure chambers, one of said members being stationary, the other said member being movable relatively thereto and mechanically connected to said part to be steered, a hand-operable element movable with said movable member and also movable relatively thereto, said hand-operable element and movable member having a pair of passages extending therethrough from said inlet to said outlet, each of said passages communicating with a respective pressure chamber, said hand-operable element and said movable member having portions arranged to operate as valves upon relative movement between said element and movable member to close off one or the other of said passages according to the direction of relative movement, and means resiliently opposing a resultant force of substantial predetermined initial magnitude to any relative movement between said hand-operable element and said movable member from their normal relative position.

In testimony whereof I have affixed my signature.

FRANCIS W. DAVIS.